H. L. FISCHER.

PENCIL.

APPLICATION FILED SEPT. 30, 1921.

Reissued Oct. 3, 1922. 15,463.

Inventor:
H. L. Fischer

Reissued Oct. 3, 1922. Re. 15,463

UNITED STATES PATENT OFFICE.

HOWARD L. FISCHER, OF ST. PAUL, MINNESOTA.

PENCIL.

Original No. 1,381,981, dated June 21, 1921, Serial No. 267,205, filed December 17, 1918. Application for reissue filed September 30, 1921. Serial No. 504,481.

*To all whom it may concern:*

Be it known that I, HOWARD L. FISCHER, a citizen of the United States, resident of St. Paul, in the county of Ramsey and State of Minnesota, have invented a new and useful Improvement in Pencils, of which the following is a specification.

My invention relates to an improvement in pencils, the primary object of which is to hold a stick marking lead or medium in position for writing in a pencil so that it can be ejected a step at a time out of the barrel, the means for holding the lead in writing position being adapted to practically inclose all but the marking end, which projects from the pencil barrel, of the lead to protect the same against accidentally being broken, the holding means being removable with the ejecting mechanism from the pencil or barrel so that the holding means can be easily separated from the ejecting mechanism and refilled with a new marking lead, whereupon the lead holding means and ejecting means are put together and reinserted into the pencil barrel. It is a highly essential feature of this invention to have a holding means for the lead which is held in writing position removable from the pencil casing in a pencil of this construction, primarily for the reason that should the pencil be dropped upon the projecting marking point, the lead might be crushed in the holding means and jammed so tightly therein that it would be practically impossible for the ejecting means of the pencil to force the jammed lead out of the holding means so as to allow a new marking lead to be inserted therein. My invention provides a holding means which, being easily removed, can be readily cleaned of any crushed lead, or a new holding means can be readily and quickly attached to the ejecting means and inserted, with the ejecting means, into the pencil casing, ready for use. This construction adds to the commercial value of my pencil, so as to provide a pencil with parts which can be easily replaced at a small cost, if it is necessary, still using the same barrel or shell. The parts of my pencil are made so as to be readily interchangeable from one pencil to the other.

The construction of my pencil is such that the marking lead can be ejected a short distance out of the barrel of the pencil, when it is desired for use, and easily and quickly pushed back into the pencil barrel and lead holding means for the purpose of economy and for protecting the marking end of the lead against being accidentally broken off while the pencil is carried in the pocket, or otherwise.

My lead holding means and pencil are particularly adapted to the use of a marking lead of a very small diameter, which does not require sharpening, and is only ejected a very short distance at a time from the writing end of the pencil.

A further object of my invention is in a pencil having means for holding the ejecting and lead holding means collectively removable from the barrel or casing of the pencil, with means on the ejecting mechanism for engaging against a shoulder formed near the rear end of the pencil casing or barrel, to hold the ejecting mechanism and lead holding means at a set position in the pencil casing while a head or cap, for the pencil, compresses a portion of the ejecting mechanism to hold the same in the pencil casing under spring tension at all times when the cap is in place. This construction gives a pencil in which the pencil casing or barrel has no shoulders or obstructions in its forward end near the conical portion which might be liable to collect and hold any little particles of the marking lead which might accidentally be broken off from the lead in writing position, and remain in the pencil casing or barrel when the ejecting mechanism is taken out. On the other hand, this construction gives a pencil casing which is hollow, with a smooth contour from the conical forward end to the rear of the pencil, and any lead particles of the marking lead which might collect in the forward end during the use of the pencil, or accidental breaking of the lead, will easily drop out of the pencil casing when the ejecting mechanism is removed. The apex of the pencil barrel has an opening of practically the same diameter as the marking lead to be used therein, thus the lead is held against lateral movement when it projects through the apex of the pencil, and for this reason, it is highly important not to have any shoulders or projections in the pencil casing to collect any fine particles which might break off from the lead, as these particles have a tendency to clog the small opening in the apex of the pencil casing if they remain in the casing when the lead holding and ejecting mechanism are removed to insert a new marking lead.

In the drawing forming part of this specification:

Figure 1:
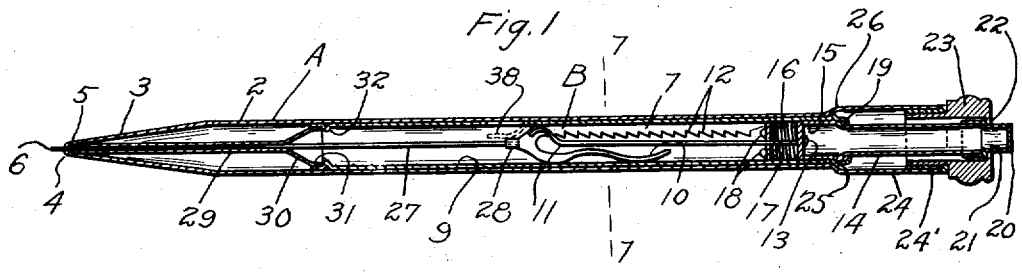
Figure 1 is a longitudinal cross section of my pencil.
Figure 2:
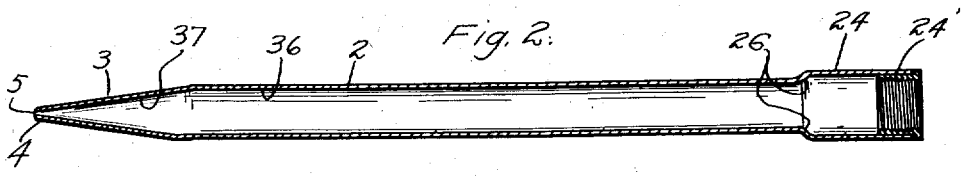
Figure 2 is a longitudinal cross section of the body portion of the barrel or casing.
Figure 3:
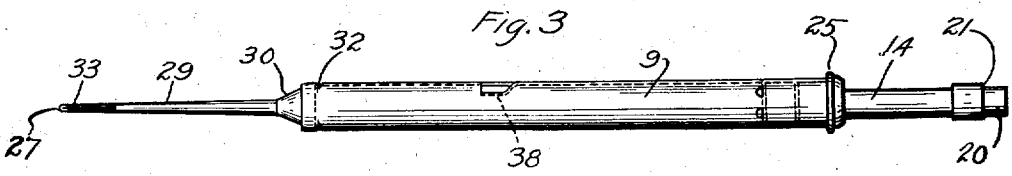
Figure 3 is a side elevation of the lead holding and ejecting means removed from the pencil casing or barrel.

In the drawing, the pencil A has a barrel 2 of thin tubing, with a conical forward end 3, the apex 4 of which is formed with a small opening 5 which is practically the same diameter as the marking lead 6.

A ratchet ejecting mechanism B is adapted to eject the marking lead 6 a step at a time through the opening 5 in the pencil casing 2. The ejecting mechanism is composed of a tooth rack 7 which is slidably held in a longitudinally extending groove 8 formed in the tubular casing 9, which is adapted to inclose the ratchet mechanism. A spring finger 10, which is formed integral with the rack 7, is adapted to engage the inner surface of the housing 9, to hold the rack 7 in a set position in the housing. A spring pawl 11 is adapted to engage the teeth 12 of the rack 7 to operate the rack in a forward direction, and the pawl 11 is rigidly secured at 13 to the tubular pusher rod 14. The forward end of the tubular pusher rod has an enlarged head 15 formed thereon which is slidably positioned in the rear end of the housing 9, and a coil spring 16 is interposed between the closed end of the head 15 and a washer 17, which is held in position in the housing 9 by means of the engaging fingers or stops 18, the pawl 11 is freely slidable through the washer 17. The coil spring 16 is adapted to hold the head 15 of the tubular pusher rod 14 against the inturned edge or shoulder 19 formed on the rear end of the housing 9, so as to hold the pawl 11 in backward position and hold the tubular pusher rod in backward position, under spring tension in the housing 9.

The outer or free end of the tubular pusher rod 14 is closed by a cap 20, having an annular shoulder 21 which is engaged by the annular inwardly projecting edge 22 of the pencil head or cap 23 to hold the ejecting mechanism in the pencil casing 2. The cap 23 is adapted to engage the threaded portion 24′ in the rear enlarged end 24 of the pencil casing.

An annular projecting shoulder 25 is formed on the rear end of the casing or housing 9, and engages the shoulder 26 formed in the rear end of the pencil casing 2, in the formation of the enlarged end 24, so that when the ejecting mechanism B, with its inclosing housing 9 is inserted in the pencil casing 2, the shoulder 25 will engage against the shoulder 26 and the cap 23 will force the pusher rod 14 inward against the spring 16, slightly compressing the same, thereby holding the pusher rod 14, the housing 9 and the ejecting mechanism B in the pencil barrel 2 under the tension of the spring 16 to prevent rattling or free movement of the same in the casing.

The hollow pusher rod 14 forms a magazine for extra marking leads, such as 6, to be conveniently carried in the pencil. The marking leads can be removed from the tubular pusher rod 14 by removing the cap 20.

The ratchet mechanism B is operated by depressing the cap 20, which projects out of the pencil head 23. When the cap or button 20 is depressed, the spring 16 is compressed, and the pawl 11 is pushed in a forward direction to push the rack 7 forward, and when the button or cap 20 is released, the spring 16 automatically moves the pawl 11 in a backward direction together with the pusher rod 14, to reset the same, while the spring finger 10 will hold the rack 7 in pushed forward position, allowing the pawl 11 to spring back over one of the teeth 12 of the ratchet, to engage a new tooth in position to again be pushed forward to operate the rack in a forward direction.

An ejecting rod 27, having one end rigidly fixed in the socket 28 on the rack 7, and the free end freely slidable in the lead holding tube 29, is adapted to eject the marking lead 6 out of the lead holding tube 29 and through the opening 5 in the apex of the conical end 3, when the ratchet mechanism is operated. The free end of the ejecting rod 27 forms an abutment for the rear end of the marking lead 6.

Figure 6:
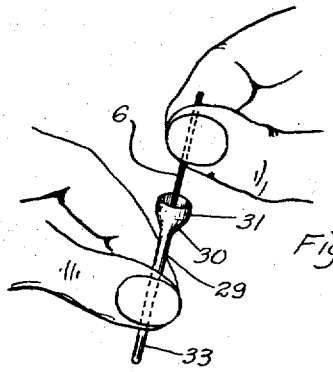
Figure 6 is a perspective of the lead holding means, illustrating the manner in which a new lead is dropped into place in the same.

The tubular lead holding means 29 is formed with a conical rear portion 30 from which projects a cylindrical portion 31 which is adapted to fit in the forward end of the housing 9, either by friction or in any other suitable manner, so as to hold the lead holding means 29 in position on the forward end of the housing 9. Shoulders 32, formed in the housing 9, prevent the cylindrical portion 31 of the lead holding means 29 from entering too far into the housing 9. The forward end 33 of the tubular holding means 29 is constricted in any suitable manner so as to engage the marking lead 6, which is inserted in the tubular holding means 29, under spring tension to hold the same in position against free movement in the forward end of the holding means 29. The rear portion of the holding tube or means 29 is enlarged so that the marking lead 6 may be freely dropped into the tubular holding means 29 as is illustrated in Figure 6. The reduced end 33 of the holding means prevents the marking lead from dropping freely through the tubular portion 29. It is essential, however, that the cylindrical portion 31 of the holding means 29 engages the housing 9 with sufficient friction, or otherwise, to always follow with, or be drawn out from the pencil casing 2 when the ejecting mechanism, with its housing, is removed from the pencil barrel.

Figure 4:
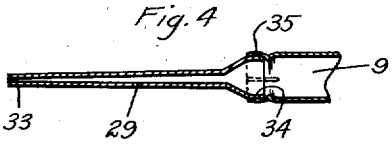
Figure 4 is a cross section of a detail portion of an alternative construction of lead holding means.

The alternative construction of the lead holding tube 29, illustrated in Figure 4, illustrates a spherical portion 34 formed on the enlarged end of the conical portion 30, which is adapted to engage in a similarly formed or shaped end portion 35 formed on the housing 9, so as to allow the lead holding member 29 to be swivelly held in the forward end of the tubular housing 9. This construction is adapted to allow for any variations in the pencil casing 2, and allows the conical end 3 to freely position the constricted end 33 of the lead holding means 29 in the pencil casing, to axially position the holding means 29 and the marking lead 6, which is held in the holding means 29, in writing position.

The holding means 29 practically incloses the entire portion of the marking lead 6, the only portion of which is exposed is the writing end which projects through the axial opening 5 in the apex of the conical portion 3. In this manner, the body portion of the marking lead 6 is protected at all times while in use in the pencil, still the holding means 29 is removable with the ejecting mechanism so that it can be easily filled, as illustrated in Figure 6, or should any of the marking lead be crushed in the holder 29 by dropping the pencil with the marking end of the lead projecting, causing the ejector rod 27 to jam the lead in the holding means 29, the same can be easily cleaned out either with the ejecting rod 27, or other suitable means. If the holding means 29 has been permanently injured, a new holding means can be easily and quickly attached to the ejecting mechanism in the housing 9, and the pencil is again ready for use. This feature is highly important in the successful operation of a pencil of this character.

Further, it is important that the constricted end 33 of the holding member 29 be protected by the conical portion 3 and the apex of the pencil casing, thus preventing any damage by dropping and bending, or otherwise injuring the constricted end 33. In this construction, the holding member 29 remains in a set position when in the pencil casing 2.

The placing of the shoulder 25 on the casing or housing 9 at the rear of the same so as to engage the shoulder 26, allows the pencil casing 2 to be formed with a smooth inner cylindrical surface 36, which joins the smooth inner conical surface from the shoulder 26 to the axial opening 5 in the apex of the conical portion 3. This construction prevents any particles of lead which may break off from the marking lead from being caught and held in the barrel portion 2, which would tend to clog the opening 5 and prevent the successful operation of the pencil.

Figure 5:
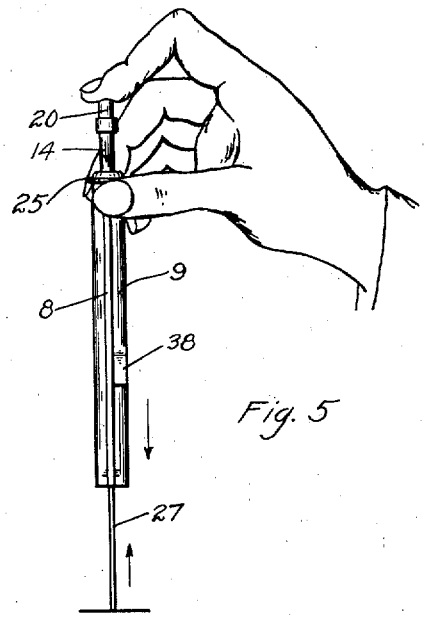
Figure 5 is an illustration of the position in which the ejecting mechanism is held and operated to reset the ejecting rod.
Figure 7:
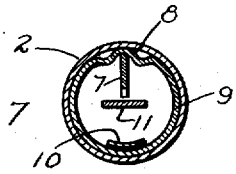
Figure 7 is a cross sectional view on the line 7—7 Figure 1.

In the operation of the pencil A, as the marking lead 6 is used up, or the projecting portion wears down in use, the lead is ejected by depressing the button or cap 20, operating the ejecting mechanism B to push the ejector rod 27 forward. Should it be desired to push the projecting portion of the marking lead back into the pencil A, it is only necessary to depress the cap or button 20 as far as possible, which forces the pawl 11 into engagement with the releasing shoulder 38 formed in the housing 9, depressing the forward end of the pawl 11 free of the teeth 12, and allowing the marking lead 6 to be freely pushed backward into the pencil A, also forcing the ejecting mechanism in backward position in the casing 9. As the marking lead in the holding member 29 is used up, the ejector rod 27 will extend into the tubular portion of the member 29 and eventually extend entirely through the holding member 29 to completely eject the lead 6. It is evident, however, that the rod 27 can be made shorter and project only part way through the holding member 29, allowing a new lead to be inserted and causing the remainder of the old lead to be ejected from the holding member. When it is desired to refill or place a new marking lead in writing position in the pencil A, the cap 23 is unscrewed and removed, allowing the ejecting mechanism to be collectively removed, together with the lead holding means 29. The holding means 29 is then removed from the housing 9 and the ejector rod 27 set into backward position by holding the housing 9 in the fingers, as illustrated in Figure 5, depressing the tubular pusher rod 14 by pressing on the cap 20 with the index finger, thus releasing the pawl 11 from the teeth of the rack, and allowing the ejector rod 27 to be freely pushed back into the housing 9. A new marking lead is then taken from the hollow pusher rod 14 and dropped into place in the holding means 29, as illustrated in Figure 6, whereupon the holding means 29 is placed in position on the forward end of the housing 9, and the holding means, together with the ejecting mechanism, again reinserted into the pencil casing, replacing the cap 23 which holds the mechanism in place in the pencil barrel. The pencil is then again ready for use.

In accordance with the patent statutes, I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claims.

I claim—

1. In a pencil having a thin tubular barrel, an ejecting means collectively and removably held in said barrel, a removable cap for holding said ejecting means in said barrel and means for holding a marking lead in writing position so that its marking end can be projected out of the apex of said pencil barrel, said lead holding means being firmly held to said ejecting mechanism so as to be removed therewith when said ejecting mechanism is removed from said barrel, and said holding means being separable from said ejecting mechanism when the same is removed from said pencil barrel, whereby a new marking lead can be inserted freely into said lead holding means, and said lead holding means can be again attached to said ejecting mechanism and reinserted in operating position in said pencil barrel.

2. In a pencil, a barrel or casing, a lead holding means for holding a marking lead in writing position, in said barrel, said lead holding means being entirely inclosed in the forward end of said pencil, an ejecting mechanism held collectively removable from said pencil casing or barrel, said lead holding means being detachably held to said ejecting mechanism and means for holding said lead in said lead holding means against free longitudinal movement in said holding means.

3. In a pencil having a hollow barrel, an ejecting mechanism, a head for holding said ejecting mechanism in place in said barrel, a tubular lead holding means for holding a marking lead in writing position, means for engaging said lead holding means so that it is removable collectively with said ejecting means to allow said lead holding means to be refilled and said ejecting mechanism to be reset and again collectively reinserted in said pencil barrel.

4. In a pencil of the class described, a tubular barrel, an ejecting means, a tubular lead holding means for holding a marking lead in writing position, means for holding said lead holding means collectively removable and means for engaging said ejecting means positioned near the rear of said pencil to form a stop or shoulder to limit the inward positioning of said ejecting mechanism in said pencil barrel, resilient means in said ejecting means and a removable head or cap for said pencil which is adapted to hold said ejecting mechanism against said stop or shoulder under the tension of said resilient means, the positioning of said stop or shoulder leaving the forward end of said pencil barrel clear of any obstructions with a smooth contour from said shoulder to the apex of said pencil barrel for the purposes specified.

5. In a pencil of the class described, a tubular barrel having a forward conical end, an opening in the apex of said conical end of approximately the same size and shape as the cross section of a marking lead used in said pencil, an ejecting means, a lead holding means removable with said ejecting means and a shoulder positioned at the rear of said pencil barrel for limiting the inward positioning of said ejecting means in said pencil barrel, said pencil barrel having a smooth contour from said stop or shoulder at the rear of said pencil barrel to said opening in the apex of said conical end for the purposes specified.

6. In a pencil of the class described, a tubular barrel having a forward conical end, an opening in the apex of said conical end, an ejecting means, means for inclosing said ejecting means to hold the same freely removable from said pencil barrel, a tubular lead holding means for holding a marking lead in writing position practically inclosed, means for detachably holding said lead holding means to said ejecting inclosing means, a tubular pusher rod in the rear of said enclosing means, resilient means for holding said tubular pusher rod in backward position, a removable cap for closing the end of said pusher rod, a removable cap for said pencil having a central opening through which said pusher rod cap is adapted to extend and a shoulder formed in said barrel and on said ejecting inclosing means near the rear of said pencil for limiting the inward positioning of said ejecting means in said pencil barrel, said removable pencil head or cap holding said tubular pusher rod in position to hold said resilient means compressed when said pencil head is in closed position on said barrel, whereby said ejecting means, housing, tubular pusher rod and said lead holding means are held under spring tension in said pencil casing.

7. In a pencil of the class described, a tubular barrel having a conical forward end, an opening in the apex of said conical end, an ejecting means, a tubular means for inclosing said ejecting means, a tubular pusher rod for operating said ejecting means, a cap for said pusher rod, a cap for said pencil for holding said ejecting means in position in said pencil barrel, an opening formed through said pencil cap through which the cap of said pusher rod is adapted to extend, resilient means for holding said tubular pusher rod with its cap projecting through the opening in said pencil head, a tubular lead holding means for holding a marking lead in writing position, means in said tubular lead holding means for holding a marking lead in writing position, means in said tubular lead holding means for holding said lead against free longitudinal movement therein, means for swivelly and detachably connecting said lead holding means with said tubular ejecting mechanism inclosing means and releasing means formed in said tubular ejecting mechanism inclosing means for releasing the ejecting mechanism inclosed therein to allow the marking lead or the ejecting mechanism to be moved backward in said tubular inclosing means for said ejecting mechanism.

8. In a pencil having a barrel, a lead ejecting means, means for collectively and removably holding said ejecting means in said barrel, a tubular lead holding means connected with said ejecting means and means for swivelly and detachably connecting said tubular lead holding means to said ejecting mechanism inclosing means, said swivel means allowing said tubular lead holding means to be freely guided and positioned axially in the forward end of said pencil barrel.

9. In a pencil of the class described, a barrel, a lead ejecting means adapted to be inclosed and removably held in said barrel, a tubular lead holding means for holding a marking lead axially in the forward end of said pencil, means in said lead holding means for holding the lead contained therein against free longitudinal movement and means connecting said lead holding means with said ejecting means, whereby said lead holding means can be freely guided and positioned axially in the forward end of said pencil barrel when the ejecting means and lead holding means are reinserted in the barrel, after they have been removed.

10. A pencil comprising a shell having a tapered inner wall at one end and a lead opening at the apex of said tapered wall; a lead tube having a portion held rigidly against lateral movement in said shell and a portion engaging said tapered inner wall; and a connection between said portions permitting the second-mentioned portion of the shell to yield laterally out of alinement with said first-mentioned portion, the yielding of said second-mentioned portion being controlled by said tapered inner wall.

11. A pencil comprising a shell having its inner wall at one end tapered with a lead opening in said tapered end; and a lead tube made up of two portions, one portion being held against lateral movements in the shell and provided with a socket in one end and the other portion having a ball at one end thereof disposed in said socket and its other end engaging the wall of said tapered end of the shell.

12. A pencil comprising a shell having its inner wall at one end tapered with a lead opening in said tapered end, and a lead tube mounted in the shell with one end portion resting against said tapered inner wall and holding the bore of the lead tube in registration with said lead opening, there being a joint in said lead tube adapting said end portion for lateral movements.

13. A pencil comprising a shell with its inner wall at one end tapered and a lead opening at the apex of said tapered end, and a lead tube mounted in said shell with a portion held rigidly in the shell, and a universal joint in the lead tube rendering the latter flexible, said universal joint permitting the lower portion of the lead tube to be held by said tapered inner wall with the bore of the lead tube always in registration with said lead opening.

14. A pencil comprising a shell having a tapered inner wall with a lead opening at the apex of said tapered inner wall, and a flexible lead tube disposed in said shell with one end engaging said tapered inner wall, the latter holding the bore of the lead tube in registration with said lead opening.

HOWARD L. FISCHER.